(12) United States Patent
Kim et al.

(10) Patent No.: US 9,400,191 B2
(45) Date of Patent: Jul. 26, 2016

(54) METHOD AND APPARATUS FOR DATA MANAGEMENT IN ADVANCED METERING INFRASTRUCTURE NETWORK

(71) Applicant: Electronics and Telecommunications Research Institute, Daejeon (KR)

(72) Inventors: Hyun-Hak Kim, Daejeon (KR); Tae-Wook Heo, Daejeon (KR); Kwang-Soo Kim, Daejeon (KR); Jong-Arm Jun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 441 days.

(21) Appl. No.: 13/871,975

(22) Filed: Apr. 26, 2013

(65) Prior Publication Data

US 2013/0285835 A1    Oct. 31, 2013

(30) Foreign Application Priority Data

Apr. 27, 2012  (KR) .......................... 10-2012-0044927

(51) Int. Cl.
- *G08B 23/00* (2006.01)
- *G01D 4/00* (2006.01)
- *H04Q 9/00* (2006.01)

(52) U.S. Cl.
CPC ................. *G01D 4/002* (2013.01); *H04Q 9/00* (2013.01); *G01D 4/004* (2013.01); *Y02B 90/242* (2013.01); *Y02B 90/246* (2013.01); *Y04S 20/322* (2013.01); *Y04S 20/42* (2013.01)

(58) Field of Classification Search
CPC ......... G01D 4/002; H04Q 9/00; Y02B 90/242
See application file for complete search history.

(56) References Cited

U.S. PATENT DOCUMENTS

| 7,929,792 B2 | 4/2011 | Gandolph et al. |
| 7,936,723 B2 | 5/2011 | Yi et al. |
| 8,238,236 B2 | 8/2012 | Kim et al. |
| 2009/0171916 A1* | 7/2009 | Kirk .................. G06F 17/30483 |
| 2010/0007521 A1* | 1/2010 | Cornwall ................. H04Q 9/00 340/870.02 |
| 2010/0008381 A1 | 1/2010 | Jang et al. |
| 2010/0169341 A1* | 7/2010 | Hu ....................... G06F 17/3064 707/758 |

FOREIGN PATENT DOCUMENTS

| KR | 10-0651441 A | 11/2006 |
| KR | 10-2006-0124379 A | 12/2006 |
| KR | 10-2009-0027157 A | 3/2009 |

* cited by examiner

*Primary Examiner* — Omeed Alizada (57) ABSTRACT

A method for transmitting, storing and managing data by compressing data packets to be transmitted and received over an advanced metering infrastructure (AMI) network with low-capacity memory and low-transfer rate. A number of transmission packets may be reduced using at least one of a bitmap interval algorithm that assigns a bitmap value to each interval, thereby reducing a number of request packets, a repeated-bitmap interval algorithm that represents sequential data values as bitmap values by toggling a bit value between 0 and 1 in each data value when a change occurs in the sequential data values, and a run-length encoding algorithm that compresses data by encoding run length of sequential identical data.

6 Claims, 4 Drawing Sheets

METHOD AND APPARATUS FOR DATA MANAGEMENT IN ADVANCED METERING INFRASTRUCTURE NETWORK

CROSS-REFERENCE TO RELATED APPLICATION(S)

This application claims the benefit under 35 U.S.C. §119(a) of Korean Patent Application No. 10-2012-0044927, filed on Apr. 27, 2012, in the Korean Intellectual Property Office, the entire disclosure of which is incorporated herein by reference for all purposes.

BACKGROUND

1. Field

The following description relates to a smart grid network, and more particularly, to data transmission in an advanced metering infrastructure (AMI) network.

2. Description of the Related Art

Growing interest in smart grid worldwide motivates the development of smart grid-based power network, enabling energy supplying systems of various suppliers and diversified consumers' systems to be integrated with each other and to respond to and interact with each other in real time. In this regard, an advanced metering infrastructure (AMI) network has gained more attention since it allows two-way communication and integrated management between the energy suppliers and the consumers.

AMI network offers two-way services that provide not only electricity consumption measured by a meter to electricity suppliers but also diversified information from the electricity suppliers to consumers. The electricity suppliers may provide information, such as electricity price, demand response and load control (DRLC) commands, messaging, billing, and distributed energy resource control (DERC) commands to users over the AMI network. Such provided information may help the users to reduce their energy bills by controlling the electricity usage or changing the time of use of electricity.

Such AMI technologies are defined as Smart Energy Profile (SEP), which is a standardized profile created by ZigBee Alliance. SPE defines energy service interface (ESI) for connecting electricity suppliers and consumers over a network, In-Premise Display (IPD) or In-Home Display (IHD) for AMI service display, smart thermostat for temperature control, load control (LC) for energy usage control, a meter for measuring energy consumption, plug-in electric vehicles (PEVs), smart appliances, pre-pay terminals (PPTs), and home energy management systems (HEMS), and other definitions will be expected to be added.

According to SEP, a meter needs to keep recording consumption of energy in intervals of, for example, 15 minutes (at minimum 2.5 minutes and at maximum 24 hours) for at least several months. Time of use tariffs vary from country to country but are generally represented in 15-minute intervals. In addition, customer baseline load (CBL) required for calculating consumption of energy by each customer in connection with real-time pricing is also generally represented in 15-minute intervals.

Interval tables including different types of intervals are used to calculate a charge for energy used up to the present time. It may become general for such interval tables to be delivered to users' devices (ESI, IPD, LC, Meter, PEV, PPT and HEMS) while the devices exchange the interval tables, so as to provide a variety of analytic methods for reducing energy billings, wherein the interval tables show not only energy consumption on an hourly basis, a daily basis and/or a monthly basis, but also the time period in which relatively higher rate is applied due to energy consumption used beyond CBL.

The quantity of data to be transmitted between users and energy suppliers may increase if different types of interval tables should be stored or exchanged for several months. ZigBee communications, as standard communications, may be of low cost and low-power consumption, but have low-capacity memory and low transfer rate. Thus, ZigBee communication devices may be overloaded by the amount of data.

In practice, there have often been demands that a large amount of interval tables which were missing due to unpredictable events, such as communication errors for a long period of time, device reset and blackout, should be transmitted between devices implementing ZigBee technology. In addition, the devices requested electricity suppliers to provide information about energy consumption, tariffs and CBLs related to several months, at the time of start of analysis with HEMS or IPD in an effort to reduce energy bills, which led to a large amount of traffic. Currently, not a large amount of traffic flows over an AMI network since there are not many distributed smart energy (SE) devices, but it is anticipated that the traffic overload would increase as more LC or smart electronic appliances are used.

SUMMARY

The following description relates to a method for efficiently transmitting, storing and managing data by reducing data packet size to be transmitted and received over an advanced metering infrastructure (AMI) network with low-capacity memory and low-transfer rate.

In one general aspect, there is provided a method of processing a request command in an advance metering infrastructure (AMI) network, the method including: generating and outputting one request command, as a single packet, including bit values and an end time value for a target period of time to request a plurality of responses including data associated with the target period of time by means of the bit values and the end time value, wherein the bit values are generated by a bitmap interval for representing a period of time by a number of bits, each bit being assigned a predefined unit of time; and receiving a plurality of responses from another apparatus in reply to the request command.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For example, assuming that in an advanced metering infrastructure (AMI) network consumption of electricity is recorded in intervals of 15 minutes and each 15-minute interval may occupy 3 byte in a memory, 4 intervals in an hour, 96 intervals in a day, and approximately 2900 intervals in a month are generated. According to smart energy profile (SEP) defined by ZigBee alliance, request payload and response payload of ZigBee cluster library (ZCL) that is available to be transmitted at each packet transmission are 70 bytes, respectively. In a method of compression, transmission and management of packets in the AMI network, according to exemplary embodiments described hereinafter, an interval period, a memory size, and the numbers of bytes of request payload and response payload are not limited to as described above, and may vary according to environments, purpose and intention of use.

TABLE 1

Interval Table of Standard Request Payload in Smart Energy Profile

| Octets | 1 | 4 | 1 |
|---|---|---|---|
| Data Type | Unsigned 8-bit Integer | UTC Time | Unsigned 8-bit Integer |
| Field Name | Interval Channel | End Time | NumberofPeriod |

Referring to Table 1, a standard request command defined by smart energy profile (SEP) includes 1-byte interval channel field, 4-byte end time field and 1-byte number of period field. The interval channel indicates a target of request while its value indicates user's consumption of electricity or an amount of electricity supply from the user to electricity suppliers. The electricity supply from the user to the electricity suppliers may take place when the user sells surplus electricity generated by the user's private power generator, such as solar power generator. The end time field indicates an end time of an interval as defined above, and its value is represented in universal time coordinated (UTC) format. The number-of-period field indicates the number of intervals, and has 0 or an 8-bit positive integer.

TABLE 2

Interval Table of Standard Response Payload in Smart Energy Profile

| Octets | 4 | 1 | 1 | 1 | Variable |
|---|---|---|---|---|---|
| Data Type | UTC Time | 8-bit Enumeration | 8-bit Enumeration | Unsigned 8-bit Integer | Series of Unsigned 24-bit Integer |
| Field Name | End Time | Status | ProfileInterval Period | NumberofPeriods Delivered | Interval |

Referring to Table 2, a standard response payload of smart energy profile includes a 4-byte end time field, a 1-byte status field, a 1-byte profile interval period field, a 1-byte number-of-period-delivered field, and an interval field having various variables. The profile interval period field indicates an interval period. A period between intervals varies in the response payload according to the setting of profile interval period field. As described above, assuming that one interval value occupies 3 bytes in memory and an available size of ZCL to be transmitted at each packet transmission is 70 bytes as defined in SEP of ZigBee, the sum of end time field, status field, profile interval period field and number-of-period-delivered field is 7 bytes. Here, in Table, octet refers to a set of eight bits. That is, 1 octet means 8 bits, that is, 1 byte. Therefore, 63 bytes out of 70 bytes can be assigned to the interval field. Given that each interval is 3 bytes, up to 21 intervals can be transmitted at each response packet transmission.

For example, when device 2 requests device 1 for electricity consumption from the $1^{st}$ to the $3^{rd}$ of January, an interval channel field of a request command is set to user's consumption of electricity, while an end time field has, as its value, the midnight of the $3^{rd}$ of January represented in UTC format. Providing that a length of each interval is 15 minutes, there are 96 intervals in a day, and there are 288 intervals for three days, as represented by 3 (days)*96 (Intervals/day). Because up to 21 intervals can be transmitted at each response packet transmission, about 13.7 response packets, that is, 14 response packets are required, and accordingly 14 request packets are also necessary. Hence, a total of 28 times of packet communications are required to transmit all intervals associated with the three days.

Figure 1:
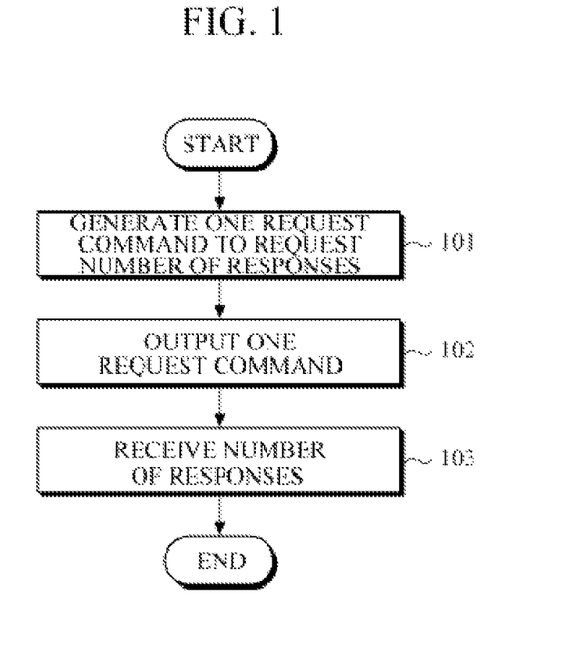
FIG. 1 is a flowchart illustrating a method of processing a request command in an AMI network.

FIG. 1 is a flowchart illustrating a method of processing a request command in an AMI network. Referring to FIG. 1, one request command is generated as one packet to request a number of responses in 101. Then, the generated request command is output in 102. As described above, in order to receive a number of responses, it is necessary to issue a corresponding number of request commands. However, the AMI network of low transfer rates needs to compress request data to be transmitted. Therefore, the present embodiments provide a data compression method to request a number of responses using one request command. A request command may include a bit value and a specified end time of a target period, wherein the bit value is generated using an algorithm that assigns a predefined time to one bit and enables the number of bits to represent an arbitrary period of time. According to the exemplary embodiments, it may be possible to request a number of responses that include data associated with the target period using a single request command. A number of responses are transmitted in reply to the single request command in 103.

A method of compressing request packets into a single request command that request a number of responses is as follows.

TABLE 3

Structure Table for Request Command Employing Bitmap Interval

| Octets | 1 | 4 | 1 | Variable |
|---|---|---|---|---|
| Data Type | Unsigned 8-bit Integer | UTC Time | 8 bit Enumeration | N bit BitMap |
| Field Name | Interval Channel | End Time | ProfileIntervalPeriod | BitmapIntervals |

TABLE 4

Bitmap Interval

| Bit | Description |
|---|---|
| N-1 | N-th profile interval period field prior to end time |
| ... | ... |
| 0 | Last profile interval period field prior to end time |

Referring to Tables 3 and 4, a standard request command according to the exemplary embodiment includes an interval channel, an end time, a profile interval period and a bitmap interval. The bitmap interval represents data as a collection of bits by dividing the data, which is associated with a certain amount of time prior to a set end time, into fields according to the profile interval period. In tables, N denotes the number of digits of the bitmap interval.

TABLE 5

Example of Interval Table of Request Command Employing Bitmap Interval

| Octets | 1 | 4 | 1 | 1 |
|---|---|---|---|---|
| Data Field Name | Unsigned 8-bit Integer Interval Channel | UTC Time End Time | 8 bit Enumeration ProfileIntervalPeriod | N bit BitMap BitmapIntervals |
| 1$^{st}$ Packet Data Value | 0x00 | Conversion Value of 1$^{st}$ of March in UTC Time Format | 0x00 | 0x07 |

Referring to FIG. 5, in a case of requesting, for example, electricity consumption data of a period from midnight on the 1$^{st}$ to midnight on the 3$^{rd}$ of January, an interval channel is set to an amount of user's electricity consumption and an end time is obtained by converting the midnight on the 3rd of January in local time zone to UTC time format. Then, the profile interval period is set to one day, and, therefore, each bit of the bitmap interval represents one day. If a bitmap interval is specified as "0x00000111(=0x07)", it indicates the last three profile interval periods prior to the end time. Since one profile interval period represents one day, the bitmap interval, "0x00000111(=0x07)", indicates a request for data relating to the last three days prior to the end time. When the data associated with only the 1st and the 3rd of March is requested a bitmap interval may be set to "0x00000101". That is, binary numbers of the bitmap intervals represent the sequential profile interval periods prior to the end time in the reverse order from the rightmost to the leftmost.

Figure 2:
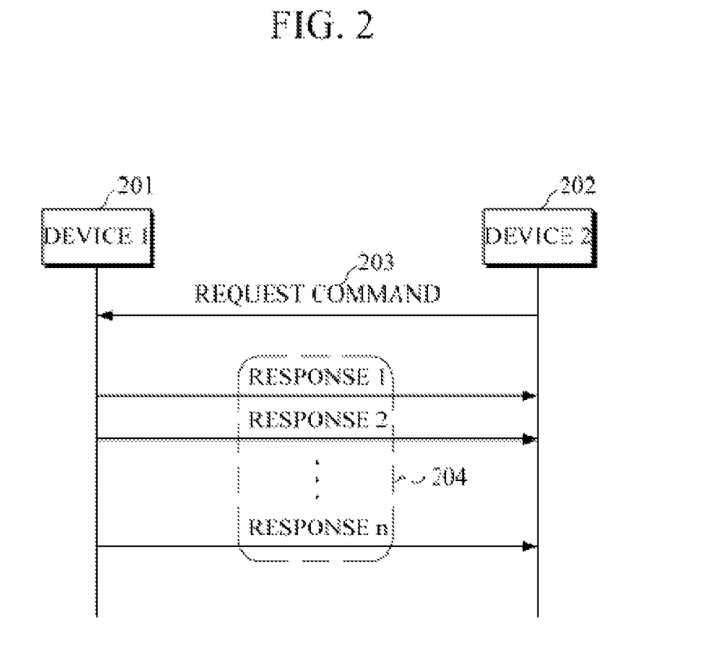
FIG. 2 is a flowchart illustrating a method of packet communication in response to a request command that employs a bitmap interval algorithm.

FIG. 2 is a flowchart illustrating a method of packet communication in response to a request command that employs a bitmap interval algorithm.

Referring to FIG. 2, in response to receiving a single request command 203 that employs a bitmap interval from transmitting from device 2 202, device 1 101 transmits a plurality of responses 204 to device 2 202. The plurality of responses 204 may be transmitted according to a profile interval period and a bitmap interval included in the single request command 203. Therefore, data of electricity consumption for three days can be requested by means of a single request command. In FIG. 2, n denotes the number of responses 204 being transmitted in response to the request command 203.

The bitmap interval scheme enables a request command of a small number of packets to request electricity consumption data that fails to be received for repetitive and sparse error periods caused by frequent packet communication errors. For example, in a case where pieces of electricity consumption data associated with the 1$^{st}$ of January and the 3$^{rd}$ of January are missing in the responses in the example described above, a request command is created to request the relevant data by setting a profile interval period to one day, an end time to midnight of 3$^{rd}$ of January, and a bitmap intervals to "0x00000101".

TABLE 6

Interval Table of Request Command Employing Bitmap Interval for Requesting Missing Data

| Octets | 1 | 4 | 1 | 12 |
|---|---|---|---|---|
| Data | Unsigned 8-bit Integer | UTC Time | 8 bit Enumeration | N bit BitMap |
| Field Name | Interval Channel | End Time | ProfileIntervalPeriod | BitmapIntervals |
| 1$^{st}$ Packet Data Value | 0x00 | Conversion Value of 1$^{st}$ of March in UTC Time Format | 0x03 | 0x44  0x44  ...  0x44 |

Referring to Table 6, in a case where some is missing in data for particular dates, relevant request command packets may be reduced using the bitmap interval scheme. Referring again to Table 3, the interval periods are in units of 15 minutes, and the missing period is thus likely to be 15 minutes. Therefore, the profile interval period is set to 15 minutes and bitmasking is performed on each missing period in units of 15 minutes, thereby reducing more request packets. Bitmasking refers to process of using bitwise operators, such as &, |, etc. to detect whether each bit is "0" or "1". For example, when electricity consumption data for periods from minute 15 to 30 of each hour is missing in received data relating to the electricity consumption on the $3^{rd}$ of January and an interval period is in units of 15 minutes, a conventional method may require 24 request packets as request commands for the missing data. On the other hand, when using a bitmap interval scheme, it is possible to request the missing data by means of a single request command. 1 bit represents a 15-minute interval, so that 1 byte (=8 bits) can represent a two-hour period. To represent 24 hours consisting of 96 intervals, a total of 12 bytes are required. If a profile interval period is set to 15 minutes, a bitmap interval may be set to 0x00000100(=0x04) in order to designate intervals of minute 15 to 30 of each hour, and may be set to 0x01000100(=0x44) in order to designate interval of minute 15 to 30 of every two-hour. By arranging 12 bitmap intervals, each having a size of 8 bits, it is possible to request at most 24 interval values. That is, the respective 15-minute intervals may be represented by the individual binary bits of each bitmap interval in a reverse order, starting from the rightmost binary bit. Each bitmap interval represents two-hour period, and a series of bitmap intervals represent sequential two-hour periods prior to an end time in a reverse order, so that a final bitmap interval in the series represents the last two-hour period before the end time. The request time may not be set to minute 15 to 30 of each hour, but may be set for requesting data missing for 24 hours on a particular date according to settings of bit value.

Figure 3:
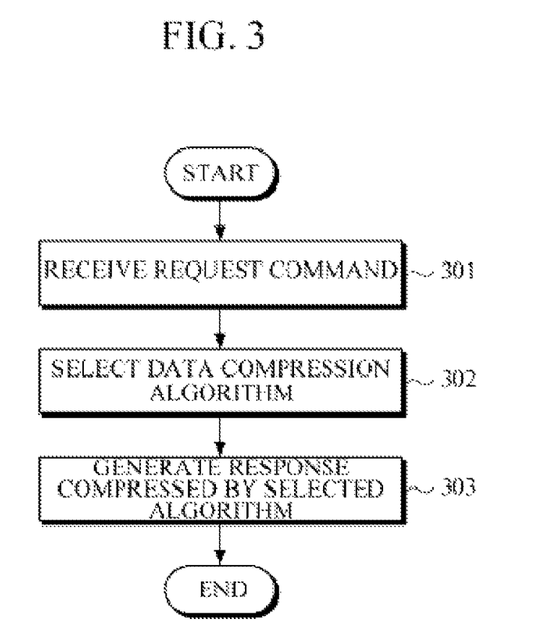
FIG. 3 is a flowchart illustrating a method of processing a response in an AMI network according to an exemplary embodiment.

FIG. 3 is a flowchart illustrating a method of processing a response in an AMI network according to an exemplary embodiment. Referring to FIG. 3, the method receives a request command that requests a response command in 301. Then, a data compression algorithm to apply to the response command is selected in 302. A data compression algorithm producing a smaller amount of data is selected between a bitmap interval algorithm and a run length algorithm which compresses data by encoding a run length of sequential identical data. Then, by using the selected algorithm, data in the responses is compressed in 303. The bitmap interval algorithm will be described later in detail with reference to Table 10 and Table 11.

Fields of electricity consumption data being transmitted and received over an AMI network consist of time intervals, so that the repetition of similar values may occur frequently and continuously. Since the electricity consumption interval is 15 minutes, which is not very long, many intervals often have the same electricity consumption value. In addition, because the user's lifestyle or energy usage pattern is likely to be repeated similarly every day or every week, repetition of the similar or same electricity consumption values may take place. For such fields with the similar or same values, a run-length encoding (RLE) scheme or an extended bitmap scheme to represent repeated values may be used to reduce the number of packets.

TABLE 7

Example of Fields of Response Employing RLE and Extended Bitmap Scheme

| Octets | 4 | 1 | 1 | 1 | Variable |
|---|---|---|---|---|---|
| Data Type | UTC Time | 8 bit Enumeration | 8 bit Enumeration | 8 bit Enumeration | Series of Octets(non ZCL Data Type) |
| Field Name | End Time | Status | ProfileIntervalPeriod | TypeOfSetOfIntervals | SetOfIntervals |

Referring to Table 7, the fields may include an end time, a profile interval period, interval set type information ("TypeOfSetOfIntervals"), and a set of intervals ("SetOfInverval").

The interval set type information indicates a response data compression method, including a RLE algorithm, a repeated-bitmap interval algorithm and information of a data reading direction. The information of a data reading direction indicates either a horizontal direction or a vertical direction, in which data is read while electricity consumption data is compressed by use of the RLE algorithm or the repeated-bitmap interval algorithm. The interval table showing electricity consumption data transmitted and received over the AMI network are based on time-intervals, and hence similar values may be frequently and continuously repeated. Specifically, because user's daily pattern or energy usage pattern tends to be repeated on a day-to-day or week-to-week basis, the similar or same values may be vertically and/or horizontally shown in the table. Hence, the electricity consumption data may be read and compressed in either a horizontal or a vertical direction according to circumstances.

The set of intervals indicates a set of data compressed using the RLE algorithm or the repeated-bitmap interval algorithm.

The RLE algorithm, the repeated-bitmap interval algorithm, and the interval set type information will be described in detail with reference to table 1.

TABLE 8

Example of Electricity consumption Table

| Intervals | 00:00~00:15 | 00:15~00:30 | 00:30~00:45 | 00:45~01:00 |
|---|---|---|---|---|
| Consumption | 1 | 1 | 1 | 1 |
| Intervals | 01:00~01:15 | 01:15~01:30 | 01:30~01:45 | 01:45~02:00 |
| Consumption | 1 | 2 | 2 | 3 |
| Intervals | 02:00~02:15 | 02:15~02:30 | 02:30~02:45 | 02:45~03:00 |
| Consumption | 3 | 3 | 3 | 3 |
| Intervals | 03:00~03:15 | 03:15~03:30 | 03:30~03:45 | 03:45~04:00 |
| Consumption | 3 | 3 | 3 | 3 |

Referring to table 8, during five intervals from 00:00 to 01:15, a value of electricity consumption appears "1", during two intervals from 01:15 to 01:45, it appears "2", and during nine intervals from 01:45 to 04:00, it appears "3". These electricity consumption values during the entire intervals may be read as "1111122333333333" in a horizontal direction. However, as shown in Table 8, the electricity consumption values may be also read as "1133123312331333" in a vertical direction. The interval set type information indicates the direction in which the values are read.

TABLE 9

Example of Set of Intervals in Response Data Compressed by RLE Algorithm, in Response to Request for 16 Intervals, in Connection with Table 8

| Octets | 1 | 3 | 1 | 3 | 1 | 3 |
|---|---|---|---|---|---|---|
| Data Type | Unsigned 8-bit Integer | Unsigned 24-bit Integer | Unsigned 8-bit Integer | Unsigned 24-bit Integer | Unsigned 8-bit Integer | Unsigned 24-bit Integer |
| Field Name | RunLength | Interval | RunLength | Interval | RunLength | Interval |
| Packet Data Value | 5 | 0x000001 | 2 | 0x000002 | 9 | 0x000003 |

Referring to FIG. 9, the response command employing the RLE algorithm may be represented by five intervals having a value "1", two intervals having a value "2" and nine intervals having a value "3". In the example described above, the electricity consumption may be transmitted over a single response command with a size of 12 bytes.

TABLE 10

Repeated-Bitmap Interval Algorithm

| Bit | Description | Value |
|---|---|---|
| N-1 | N-th ProfileIntervalPeriod prior to end time | Value of interval is identical with (N-2)-th bit value: the same value as value of (N-2)-th bit interval<br>Value of interval is different from (N-2)-th bit value: value different from value of (N-2)-th bit interval |
| ... | ... | ... |
| 1 | Last second ProfileIntervalPeriod prior to end time | Value of interval is identical with 0 bit value: the same value as value of 0bit interval<br>Value of interval is different from 0 bit value: value different from value of 0bit interval |
| 0 | Last ProfileIntervalPeriod prior to end time | 0 |

Referring to Table 10, according to the repeated-bitmap interval algorithm, a change in values of data is represented by a bitmap value which is toggled between 0 and 1. Here, N denotes the number of digits of the bitmap interval.

TABLE 11

Example of Electricity consumption Employing Bitmap Interval Algorithm in Connection with Table 8

| 11111 | 22 | 333333333 |
|---|---|---|
| 00000 | 11 | 000000000 |

For example, electricity consumption values shown in Table 8 are sequentially represented as "1111122333333333" by employing the bitmap interval algorithm of Table 10. Referring to Table 11, the first digit, number "1" in a data string, "1111122333333333", is assigned bitmap value "0", and "0" is kept being assigned to the rest of the data string until a different number appears. The electricity consumption value changes from 1 to 2 in the sixth interval, and then bitmap value "1" is assigned to the sixth interval having number "2". The seventh interval also has number "2," which is the same as the value in the sixth interval, so that the same bitmap value "1" is assigned to the seventh interval as well. In the eighth interval, the electricity consumption value changes from 2 to 3, and hence bitmap value "0" is assigned again to the eighth interval. From the eighth interval to the sixteenth interval, during which the electricity consumption value does not change, the same bitmap value "0" is assigned. As a result, the data string "1111122333333333" representing sequential electricity consumption values can be simply represented by bitmap values "0000011000000000".

TABLE 12

Example of Interval Set in Response Employing Run-Bitmap Interval Algorithm in Connection with Table 8

| Octets | 2 | 3 | 3 | 3 |
|---|---|---|---|---|
| Data Type | N bit BitMap | Unsigned 24-bit Integer | Unsigned 24-bit Integer | Unsigned 24-bit Integer |
| Field Name | RepeatedBitmap | Interval | Interval | Interval |
| Packet Data Value | 0x08   0x00<br>(Binary Bits 00000110)   (Binary Bits 000000000) | 0x000001 | 0x000002 | 0x000003 |

Referring to Table 12, the electricity consumption value shown in Table 8 may be simplified by bitmap values "0000011000000000". This bitmap values may be represented by two 8-bit (=1-byte) values, 0x08 and 0x00. The table listing fields of the response shows the electricity consumption value simplified as 0x08 and 0x00, and three interval fields are assigned electricity consumption values "1," "2," and "3," respectively. Therefore, the fields of the response shown in table 7 may be compressed as shown in Table 11.

TABLE 13

Example of Electricity consumption Value Employing Another Repeated-Bitmap Interval Algorithm in Connection with Table 8

Referring to Table 13, if an electricity consumption value changes in the following interval, the preceding interval is assigned bitmap value "1", and if there is no change in electricity consumption value in the following interval, the preceding interval is assigned bitmap value "0". According to the repeated-bitmap interval algorithm described above, with a change in an electricity consumption value, a corresponding bitmap value changes, whereas according to the repeated-bitmap interval algorithm shown in Table 13, in response to a change in electricity consumption value, a bitmap value associated with an interval following the interval corresponding to the changed electricity consumption value changes. For example, the first interval having value "1" is assigned bitmap value "0," and the same bitmap value "0" continues to be assigned up to the fourth interval. In response to a change in electricity consumption value from 1 to 2 in the sixth interval, bitmap value "1" is assigned to the fifth interval. The seventh interval is assigned bitmap value "0" since there is no change in electricity consumption value between the sixth interval and the seventh interval. In response to a change in electricity consumption value from 2 to 3 in the eighth interval, bitmap value "1" is assigned to the seventh interval. There is no change in electricity consumption energy from the eighth interval to the sixteenth interval, and thus bitmap value "0" continues to be assigned up to the sixteenth interval. Therefore, the string of sequential electricity consumption values "1111122333333333" may be represented by bitmap values "0000101000000000".

Figure 4:
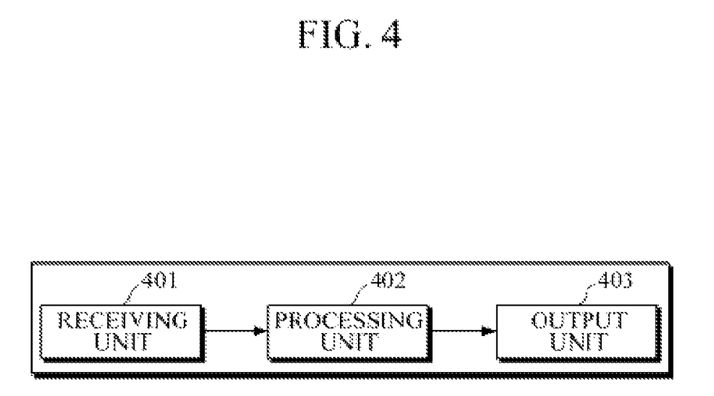
FIG. 4 is a diagram illustrating a configuration of an apparatus for processing data in an AMI network.

FIG. 4 is a diagram illustrating a configuration of an apparatus for processing data in an AMI network.

Referring to FIG. 4, the apparatus for processing data in an AMI network may include a receiving unit 401, a processing unit 402 and an output unit 403. The receiving unit 401 receives a request command, the processing unit 402 compresses the request command and a response, and the output unit 403 outputs the compressed request command and response.

The processing unit 402 generates the request command as a single packet. The request command may request data associated with a target period of time by means of bit values and an end time value for the target period of time, wherein the bit values are generated by a bitmap interval for representing a certain period of time by a number of bits, each bit being assigned a predefined unit of time. In addition, the processing unit 402 compresses data in a response using a bitmap interval algorithm or a run length algorithm which compresses data by encoding a run length of sequential identical data.

To request the electricity consumption data, a method that uses fewer packets is selected between a conventional method that generates a number of request commands respectively corresponding to a number of responses and a method using a bitmap interval. In addition, to request data that has failed to be received, a method that uses the least packets is selected among a conventional method that transmits a number of requests respectively corresponding to the missing data, a method employing RLE and a repeated-bitmap interval algorithm.

The application of the run-bitmap method, the repeated-bitmap interval algorithm, and the RLE method may not be limited to electricity consumption data, but they may apply to a diversity of data, such as data being divided into intervals or data having repetitive values, which is to be transmitted and received over an AMI network. For example, these methods may apply to data such as tariffs and customer baseline load (CBL).

As apparent from the above description, data packets to be transmitted and received over an AMI network may be compressed using a repeated-bitmap interval algorithm and/or a run length encoding method. Accordingly, the number of times of transmitting and receiving packets and a required capacity of storage memory can be significantly reduced in the AMI network with small capacity memory and low-speed transfer rate.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of processing a request command in an advance metering infrastructure (AMI) network, the method comprising:
   generating and outputting a single request command, as a single packet, including bit values and an end time value for a target period of time to request a plurality of responses including data associated with the target period of time by means of the bit values and the end time value, wherein the bit values are generated by a bitmap interval for representing a period of time by a number of bits, each bit being assigned a predefined unit of time; and
   receiving the plurality of responses from another apparatus in reply to the request command,
   wherein, in response to a change in a value of data in a sequential data string, a value of data preceding said data, whose value is changed, is represented as a bitmap value by toggling the value of the preceding data with one of bit values 0 and 1 that are alternately applied.

2. The method of claim 1, wherein the responses include one or more of electricity consumption data, tariffs and customer baseline load (CBL).

3. The method of claim 1, wherein the request command is an interval channel for setting a target of request, end time information in universal time coordinated (UTC) format indicating an end time of the target period of time, profile interval period information indicating an interval period represented by each bit, and bitmap interval information indicating a number of profile interval periods prior to the end time.

4. An apparatus for processing data in an AMI network, the apparatus comprising:
- a receiving unit configured to receive a single request command which is generated as a single packet and includes bit values and an end time value for a target period of time to request a plurality of responses including data associated with the target period of time by means of the bit values and the end time value, wherein the bit values are generated by a bitmap interval for representing a period of time by a number of bits, each bit being assigned a predefined unit of time;
- a processing unit configured to generate a response based on the received request command, wherein the response is obtained by compressing data using a repeated-bitmap interval algorithm or a run length algorithm,
- wherein the processing unit is configured to, in response to a change in a value of data in a sequential data string, represent a value of data preceding said data, whose value is changed, as a bitmap value by toggling the value of the preceding data with one of bit values 0 and 1 that are alternately applied.

5. The apparatus of claim 4, wherein the response includes one or more of electricity consumption data, tariffs and customer baseline load (CBL).

6. The apparatus of claim 4, wherein the data is a pattern of particular values being periodically repeated.

\* \* \* \* \*